May 27, 1969  T. E. LOXLEY ET AL  3,447,077
MULTIPLE MISSILE VELOCITY MEASURING APPARATUS
Filed July 21, 1966  Sheet 1 of 2

INVENTORS
THOMAS E. LOXLEY
JAMES L. SLOOP
MICHAEL S. WIELAND

BY

ATTORNEY

AGENT

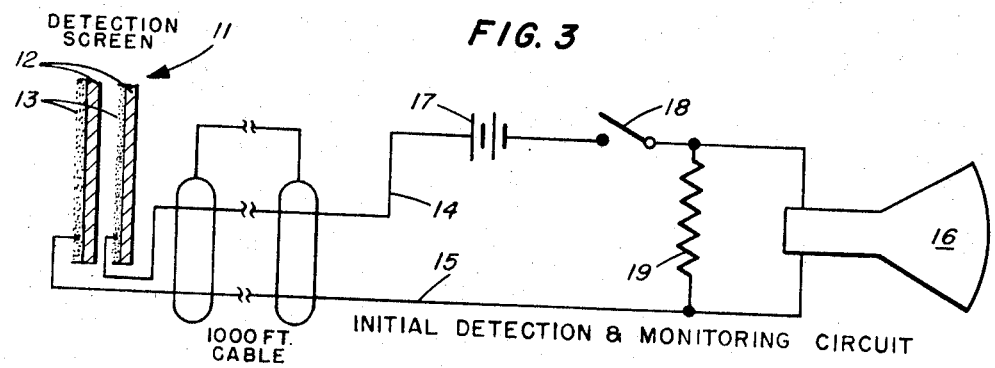
FIG. 3 — INITIAL DETECTION & MONITORING CIRCUIT
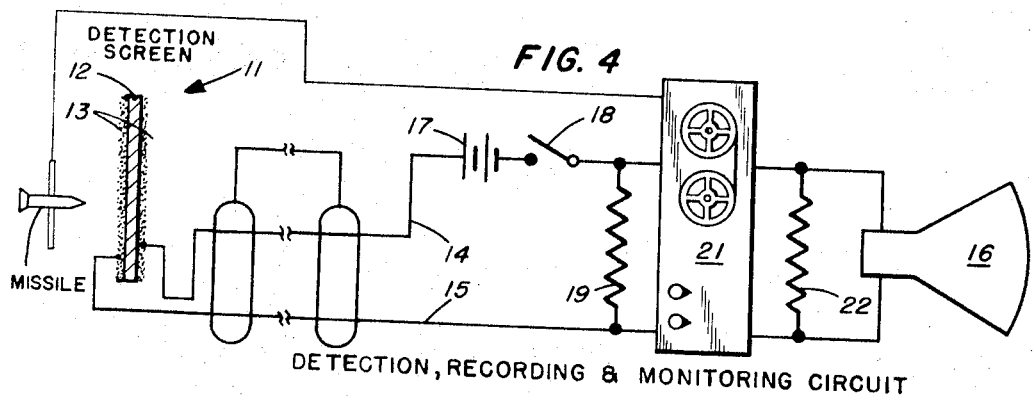
FIG. 4 — DETECTION, RECORDING & MONITORING CIRCUIT
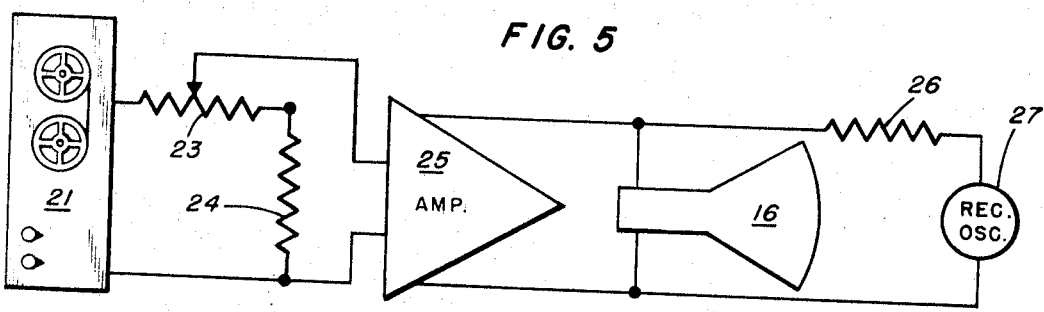
FIG. 5 — REPRODUCING & MONITORING CIRCUIT
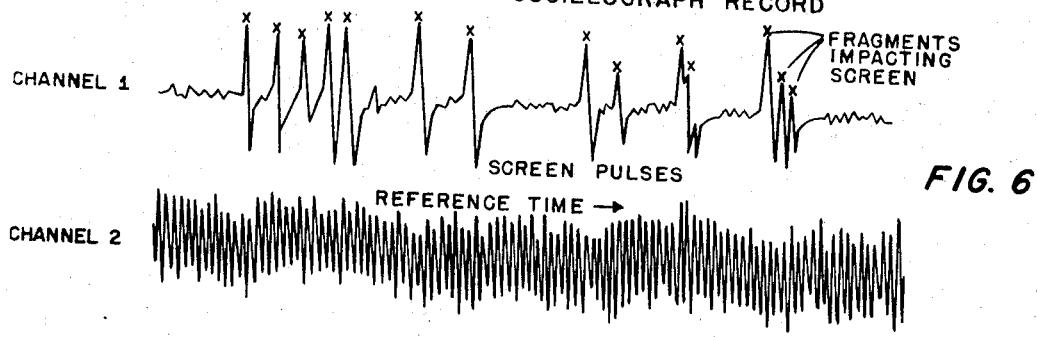
FIG. 6 — WARHEAD FRAGMENTATION OSCILLOGRAPH RECORD

United States Patent Office 3,447,077
Patented May 27, 1969

---

3,447,077
MULTIPLE MISSILE VELOCITY MEASURING APPARATUS
Thomas E. Loxley, Watervliet, N.Y., James L. Sloop, Dahlgren, Va., and Michael S. Wieland, Newark, Del., assignors to the United States of America as represented by the Secretary of the Navy
Filed July 21, 1966, Ser. No. 566,952
Int. Cl. G01r 11/02
U.S. Cl. 324—70                                    7 Claims

ABSTRACT OF THE DISCLOSURE

A missile velocity measuring system comprising a screen and related timing circuitry which can register multiple impacts. The screen itself is formed by a laminate with a central insulating sheet and two metallic outer sheets to which potential is applied. When a missile pierces the screen the missile acts as an electrical jumper between the charged metallic sheets to produce a pulse. The pulse is fed to a timing mechanism which determines velocity of the missile.

---

The invention described herein may be manufactured and used by or for the Government of the United States of America for governmental purposes without the payment of any royalties thereon or therefor.

The present invention relates to velocity measuring apparatus and more particularly to a multiple missile velocity measuring screen and timing apparatus associated therewith.

Prior art arrangements for measuring missile velocity and noting multiple impacts on a target have utilized a multiplicity of materials for the target and a variety of systems for recording the velocity of the missile. In spite of this wide range of materials and apparatus there still seems to be inherent weaknesses and undesirable features in all of the prior systems.

Among others, heretofore, there have been three systems for measuring the speed of hypervelocity projectiles. One of said systems is the use of screens with printed circuit paper having lines spaced closer together than the projectile diameter, but this system is objectionable because only one projectile can be fired through such paper. Another system places two metal foils not more than the length of the projectile apart, but this system is also objectionable because of the formation of splinters which cause the recording of false velocities. A third system has two thin layers of aluminum secured to a thin plastic sheet for closing a circuit as, or after, a projectile has passed through the sheet thereby permitting the two foil layers to touch. The disadvantage of this last mentioned system is the need for 400 volts required for operation and 800 volts to supply a heavier current for burning the aluminum foil layers apart where they contact and stick together. Another system obtains warhead fragmentation velocity data by photographing the impacts of fragments against thin metal panels. Costs of materials and labor is high while data processing is time consuming (minimum of 2 days), laborious and grossly ineffective (generally, 0 to 70% of the perforating fragments are detected). Additionally, the metal screen itself is costly and it detects only a fraction of the perforating fragments. The screen and timing mechanism of the present invention offers considerable improvement over the above enumerated prior art devices. The screen, in particular, is formed of fine molten particles of metal sprayed on non-porous paper to produce a thin frangible conductive layer on a frangible base, which will register multiple fragment impacts time and time again with complete accuracy and without having to be replaced after each firing. The structure of the screen readily lends itself to the passage of fragments without the disadvantages of splinters, ripping, or spurious impact counts while at the same time its cost is far below similar screens. Associated with the screen is a timing circuit, triggered at the instant the blast is instigated, for accurately measuring elapsed time between firing and impact to produce an accurate indication of the velocity of the missile or fragments.

An object of the present invention is the provision of a multiple missile velocity measuring screen, and a timing circuit associated therewith.

Another object is the provision of an impact recording screen which can be used many times before having to be replaced.

Still another object is the provision of an impact recording screen which registers a count when the piercing missile forms a short circuit link between two charged metallic surfaces.

Yet another object is the provision of a timing and recording system for accurately measuring the velocity of multiple missiles or fragments.

Another object is the provision of an impact screen which is produced by spraying fine molten particles of metal onto heavy non-porous paper to furnish a thin, frangible conductive layer on a frangible base.

Other objects and many attendant advantages of the invention will be readily apparent as the same becomes better understood by reference to the following detailed description when considered in connection with the accompanying drawings wherein:

FIG. 3 shows a basic timing circuit for measuring velocity of missiles.

FIG. 4 shows a modification of the timing circuit.

FIG. 5 shows another modification of the timing circuit.

FIG. 6 shows a typical oscillograph print indicating missile impacts.

Figure 1:
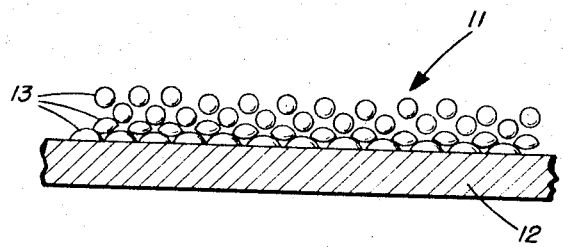
FIG. 1 shows a greatly enlarged cross-sectional view of the impact recording screen.
Figure 2:
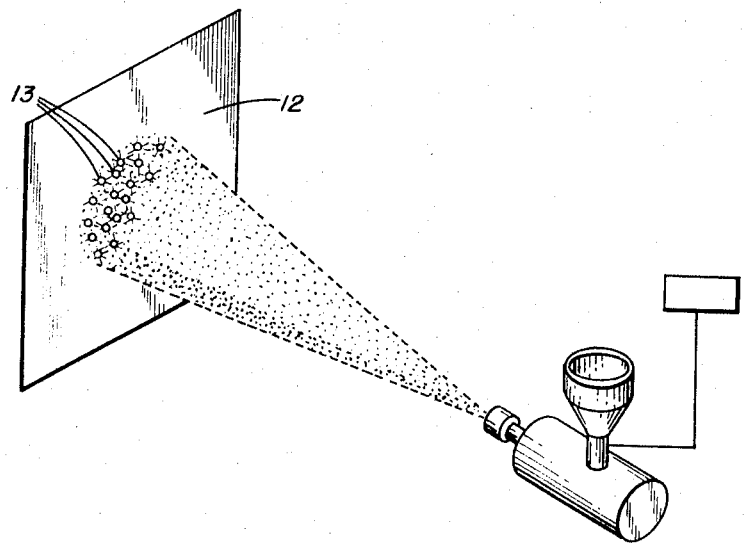
FIG. 2 shows the metal coating being applied to the screen.

Referring now to the drawings wherein like reference characters designate like or corresponding parts throughout the several views there is shown in FIG. 1 a greatly enlarged cross-sectional view of an impact screen 11 which is constructed of a paper backing 12 on which has been applied a metallic coating 13. The special nature of the screen 11 comes from the spraying of fine molten particles of metal (aluminum) onto heavy, non-porous paper to produce a thin, frangible, conductive layer on a frangible base. The metallic coating 13 takes the form of single droplets of aluminum which solidify on contact with the paper backing 12 to yield a thin splatter of aluminum. A large number of such tiny, overlapping splatters then yields the continuous conductive, but frangible surface of screen 11. The use of one such coated paper, backed by another or by a thin sheet of metal, then comprises the screen 11. The significance of the frangible construction is that a perforating metal body would produce a current path, between the two surfaces, only as it passed through the screen. Also, no significant distortion of the physical structure of the screen would take place in other than the impact area. The use of the screen 11 consists simply of applying a direct current voltage across the two conductive surfaces and monitoring the electrical discharges created by the perforating missiles. The screen sensitivity is varied by changing the thickness of the insulating material (paper 12) between conductive surfaces. Average velocities of warhead fragments, over a given baseline, are obtained by using a breakwire to produce a signal at the time of warhead detonation. Similarly, two screens could be spaced a given distance apart to measure average velocities, over that baseline, of missiles perforating both screens. A timing signal is simultaneously monitored to provide a suitable time base.

The exact method of construction of the screen consisted of utilizing a METCO 2E metallic spray gun system, the gun being fed with ⅛ inch METCO aluminum wire, with air at a minimum operating pressure of 55 p.s.i. The basic operating principle is the use of an acetylene torch to melt the aluminum, with a compressed air jet to produce the spray of molten particles. Bristolboard paper having a thickness of 0.017" was used, with the gun tip being positioned 7½" from the paper and being moved at a speed of approximately 0.7 ft./sec. Two such coats were applied. The bristolboard so treated has been used satisfactorily when back by another identical sheet or by aluminum foil, or in the alternative by one sheet of the bristolboard with the conductive coating applied to both sides, and during testing, the screens are supported in position by attaching them to the front of single ½" thick Celotex sheets.

Referring now to the various circuits and equipment which are used with impact screen 11, as timing devices to measure the velocities of missiles striking the screen, there is shown in FIG. 3 a basic and early adaptation of a detection and monitoring system. In this arrangement the screen 11 has each of its conductive coatings connected to a cable, such as 14 and 15, the cables, in turn, leading to an oscilloscope 16. In series connection in cable 14 there is a source of potential 17 and a switch 18 for applying this potential to the circuit, while a shunt resistor 19 is placed in parallel with oscilloscope 16, connected between cables 14 and 15. Operation of this circuit is initiated when a missile, or piece of shrapnel, pierces screen 11 and momentarily acts as a jumper to short circuit the conductive coatings of the screen, resulting in an indication on oscilloscope 16.

The circuit arrangement disclosed in FIG. 4 has a tape recorder incorporated therein, so that this system can perform a recording function in addition to the previous detection and monitoring function. In this embodiment the circuit of FIG. 3 has been modified to add a tape recorder 21, and another shunt resistor 22, across cables 14 and 15 in parallel with oscilloscope 16.

A reproduction and monitoring circuit is shown in FIG. 5 wherein the output of tape recorder 21 is fed to a voltage divider having resistances 23 and 24, which in turn feeds an amplifier 25 whose output is connected to the oscilloscope 16. For making a permanent recording of the impacts registered on the screen a recording oscillograph 27 and its series resistance 26 is placed in parallel with oscilloscope 16.

In the operation of the detection and monitoring circuits disclosed in FIGS. 3, 4, and 5 the circuits were used to detect fragments from a simulated warhead detonation (hollow, malleable iron cylinder loaded with plastic explosive). At test time, the impact signals as initiated by the screen are recorded on a multi-channel tape recorder 21 running at high speed (120 i.p.s.). Afterwards, the signals are played back into a high speed, multi-channel oscillograph 27 (160 i.p.s.) with the tape recorder 21 running at low speed (1⅞ i.p.s.) using the system of FIG. 5. The basic screen signals seen on the oscillograph trace are illustrated in FIG. 6. The signal is normally about 25 microseconds in duration, but can be longer depending on the fragment size and speed. Separate, simultaneous recorder and oscillograph channels are used to produce a zero time signal (detonation time) and a 100 kc. reference time signal. Circuitry must be designed so noise, frequency response, cross-talk, etc. do not interfere with the signals being monitored, and a raster-type oscilloscope may be used in lieu of an oscillograph.

The factor which limits the number of discrete signals which can be successfully monitored is the amount of signal overlap which occurs. If the spread of missile velocities is small, then a limit may be placed on the number of missiles which can be effectively monitored by a single impact screen. However, in most applications the velocity spread would be large enough so that this limitation would not be significant. Also, the screen insulator thickness can be varied so that only missiles above a certain minimal size are recorded. The data from the oscillograph records are easily and quickly obtained by personnel with minimal training and average skill.

The chart presentation of FIG. 6 shows a copy of an oscillograph record wherein there is displayed a plurality of fragmentation hits as indicated by the peaked pulses marked with small $x$'s. Successive signals, as close together as 15 microseconds, can be distinguished.

The distinct advantages of the subject screen are decreased cost and increased effectiveness over the present type screen. It is anticipated that the screen can be readily mass produced for less than 50¢ a foot versus the $5.00 a foot cost of other models. Also, the subject screen can detect 100% of the fragments perforating it, while the structure of prior art screens make their ability to detect each fragment highly dependent upon the numbers of fragments and their distribution across the screen.

Having fully described the present invention it is clear that the originality of the subject multiple missile velocity measuring apparatus, with its novel impact screen and associated timing circuitry, is the use of a simple metallic spray on paper to yield the frangible character of the screen. Similar types of screens using foil or vapor deposited conducting surfaces, separated by a plastic film, have been used, but such screens tend to detect only the first perforation due to structural damage effects created by the impact.

What is claimed is:

1. Apparatus for measuring the velocity of multiple missiles produced upon detonation of a warhead comprising:
   an impact registering screen placed a fixed distance from said warhead;
   circuit means, including a source of potential, connected to said screen for producing an impact signal each time a missile strikes said screen;
   recording means including a recording medium for recording and storing the impact signals produced by said circuit means;
   means producing a reference time signal to be stored by said recording means simultaneously with said impact signals;
   means responsive to detonation of said warhead for initiating the recording of said reference time signal; and
   means for displaying a comparison between the impact signals and the reference time signal.

2. The apparatus of claim 1 wherein said impact registering screen comprises
   a flat supporting insulator of heavy, nonporous paper; and
   a thin, frangible, conductive layer deposited on both sides of the insulating paper.

3. The apparatus of claim 2 wherein said thin, frangible, conductive layers comprise a large number of tiny, overlapping splatters of metal, said splatters being formed by spraying the insulating paper with fine molten particles of metal which solidify on contact with the paper.

4. The apparatus of claim 3 wherein the source of potential for said screen is applied to both of the conductive coatings, separated by the insulating paper.

5. The apparatus of claim 4 wherein the means for recording and storing the number of impacts received by the screen comprises a multi-channel tape recorder running at high speed.

6. The apparatus of claim 5 wherein the reference time signal is a constant 100 kilocycles.

7. The apparatus of claim 6 wherein the display means comprises an oscilloscope and a multi-channel oscillograph connected in parallel.

References Cited
UNITED STATES PATENTS

| | | | |
|---|---|---|---|
| 2,479,808 | 8/1949 | Beth | 324—70 |
| 2,959,734 | 11/1960 | Marsh | 324—70 |
| 2,989,695 | 6/1961 | Heaney | 324—70 |
| 3,215,933 | 11/1965 | Scanlon | 324—70 |
| 3,222,596 | 12/1965 | Meyer | 324—70 |
| 3,230,450 | 1/1966 | Clark | 324—70 |

RUDOLPH V. ROLINEC, *Primary Examiner.*

MICHAEL J. LYNCH, *Assistant Examiner.*

U.S. Cl. X.R.

73—35, 167; 346—38